United States Patent [19]

Tsuchihashi et al.

[11] Patent Number: 4,865,514
[45] Date of Patent: Sep. 12, 1989

[54] MANIPULATOR SYSTEM WITH SMALL ARM REMOVABLY ATTACHABLE AT POINTS ALONG LARGE ARM

[75] Inventors: Akira Tsuchihashi, Nagareyama; Naoya Ezawa, Yokohama, both of Japan

[73] Assignee: Hitachi, Ltd., Tokyo, Japan

[21] Appl. No.: 103,668

[22] Filed: Oct. 2, 1987

[30] Foreign Application Priority Data

Oct. 3, 1986 [JP] Japan ................. 61-234567

[51] Int. Cl.$^4$ ............................ B25J 18/00
[52] U.S. Cl. ................... 414/736; 414/731; 901/8; 901/27; 244/158 R; 244/161
[58] Field of Search ............... 244/158 R, 159, 161; 414/730, 731, 736; 901/8, 15, 27, 30, 41, 50

[56] References Cited

U.S. PATENT DOCUMENTS

| | | | |
|---|---|---|---|
| 3,043,448 | 7/1962 | Melton | 901/15 X |
| 4,105,241 | 8/1978 | Mee | 294/86 R |
| 4,227,853 | 10/1980 | Woodford et al. | 414/738 |
| 4,541,770 | 9/1985 | Niinomi et al. | 414/730 |
| 4,545,723 | 10/1985 | Clark | 414/730 |
| 4,620,362 | 11/1986 | Reynolds | 901/30 X |
| 4,657,211 | 4/1987 | Fuldner et al. | 244/158 R X |

FOREIGN PATENT DOCUMENTS

| | | |
|---|---|---|
| 1108668 | 9/1981 | Canada. |
| 6130387 | 2/1986 | Japan. |
| 2091194 | 7/1982 | United Kingdom ............ 244/158 R |

Primary Examiner—Frank E. Werner
Assistant Examiner—William M. Hienz
Attorney, Agent, or Firm—Fay, Sharpe, Beall, Fagan, Minnich & McKee

[57] ABSTRACT

In this manipulator system, a small arm is coupled with an arm portion of a large arm excepting the tip, and the large arm and the small arm are independently controlled to operate. For coupling the small arm with the arm portion of the large arm, a capturing mechanism located at the tip of the large arm is actuated to be coupled with a capturing mechanism of the small arm. Another capturing mechanism of the small arm is moved to a capturing mechanism located on the arm portion of the large arm to be mechanically and electrically coupled therewith. When this coupling has been completed, the coupling between the capturing mechanism located on the tip of the large arm and the capturing mechanism of the small arm is released. As a result, the small arm can be branch-connected to the large arm, and expansion of the work range and complex work become possible.

12 Claims, 5 Drawing Sheets

MANIPULATOR SYSTEM WITH SMALL ARM REMOVABLY ATTACHABLE AT POINTS ALONG LARGE ARM

BACKGROUND OF THE INVENTION

1. Field of the Invention

The present invention relates to a manipulator system capable of installing a capturing device at the tip of an arm included in an industrial robot or the like and replacing working tools.

In particular, the present invention relates to a manipulator system suitable to the work in a severe environment such as a space environment.

2. Description of the Prior Art

Upon manipulators working in space, various specifications such as the area of the working range and high precision working have been imposed. In addition, constraints such as the weight limit at the time when a vehicle is launched into space.

In order to meet these demands, there has been proposed a space station having an improved manipulator as described in JP-A-61-30387, for example. In this space station, a high precision, small-sized manipulator (a small arm) is mounted on the tip of a large-sized manipulator (a large arm) having a wide working range or they are arranged so as to be individually controlled. As a result, a wide range of conveyance work and high precision construction, maintenance and inspection work can be performed in space stations.

Since a small arm is serially connected to the tip of a large arm or they are individually controlled, however, the above described manipulator has problems described below.

(1) A complex work such as a work in which one end is held while the other end is rotated cannot be easily performed.

(2) Since the coupling of two manipulators is serial connection, there is a limit in expanding the operation region.

(3) Since the small arm is fixed to a stand or the like, mechanical and thermal protection in the space different from that of the large-sized manipulator is required, uneconomical results being caused.

(4) In case of serial coupling, force is propagated through the whole. When the load is increased, therefore, the stiffness of the whole must be raised, resulting in a largely increased weight.

(5) Since only one tip is always present, tools must be frequently replaced, resulting in a lowered efficiency.

SUMMARY OF THE INVENTION

An object of the present invention is to provide a manipulator system capable of moving a small arm to an arbitrary location of a large arm to expand the operation range.

Another object of the present invention is to provide a manipulator system facilitating complex work.

A further object of the present invention is to provide a manipulator system which can be stored without particularly providing mechanical and thermal protection for the small arm.

A further object of the present invention is to provide a manipulator system having small size and light weight on the whole and capable of coping with a heavy load.

The above described object is achieved by maintaining the operable state of the capturing device located at the tip of the large arm, coupling the small arm with the arm section of the large arm excepting the tip, mounting the capturing device, a tool and a gripper at the tip of the small arm, and making their independently controlled operation possible.

For example, at least one actuating-side capturing device and at least one actuated-side capturing device are disposed at the base of the small arm. The power supply and signal lines are so connected that the capturing device of the small arm (actuating side) may be actuated by actuating the actuating-side capturing device located at the tip of the large arm to connect the actuated-side capturing device of the small arm. Thereafter, the small arm is conveyed and coupled with the capturing device (actuated side) of the arm of the large arm by the capturing device of the large arm. After the supply of power and signal lines from the capturing device (actuated side) of the large arm has been confirmed, the small arm is detached by the actuating-side capturing device of the large arm.

The small arm is installed by the capturing device disposed at the tip of the large arm. The position for mounting it to the large arm itself cannot be freely chosen. By considering the operation region of the arm, however, the range of mounting position can be expanded. Further, a significant effect is obtained by providing the large arm with a special degree of freedom in order to expand the range of the mounting position.

DESCRIPTION OF THE PREFERRED EMBODIMENTS

Figure 1:
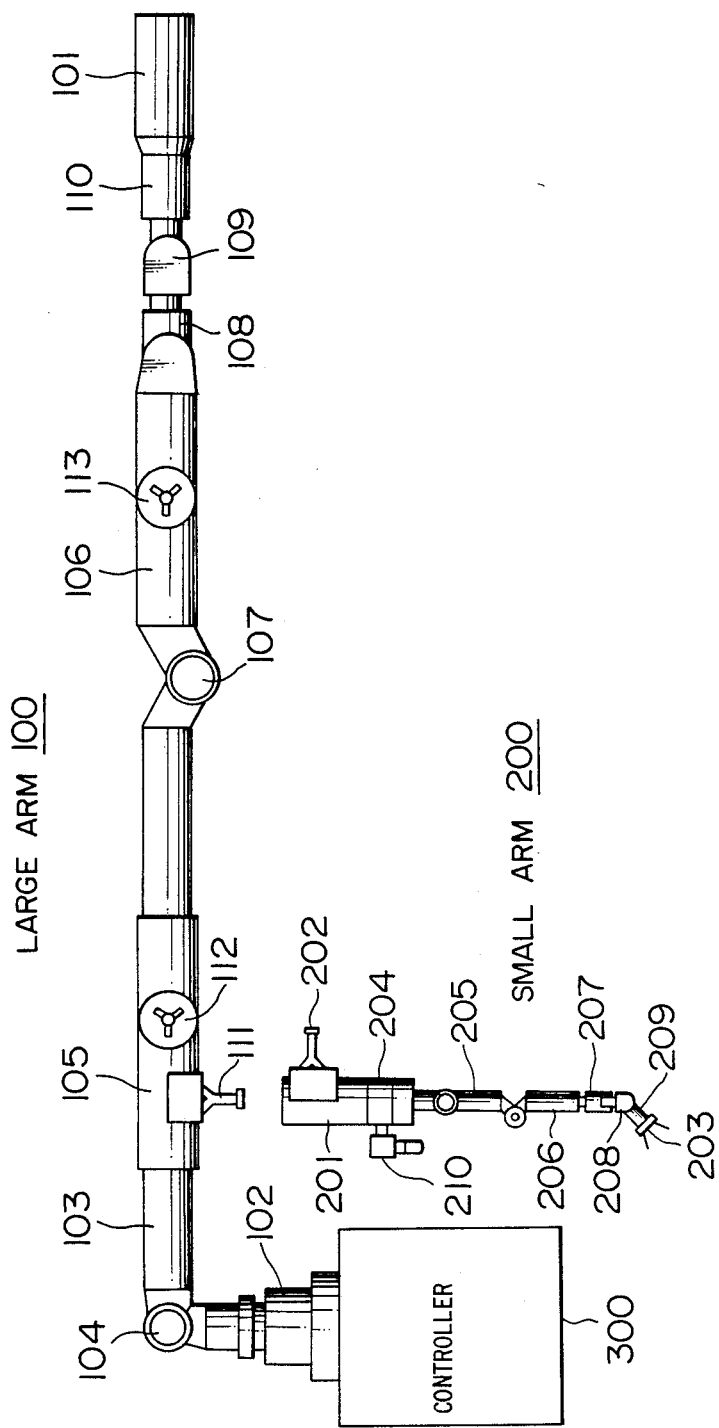
FIG. 1 is a structure diagram showing an example of the whole structure of a manipulator system according to the present invention.

An embodiment of the present invention will now be described by referring to FIG. 1. In FIG. 1, numeral 100 denotes a large arm having a long arm provided with four or more degree of freedom. Numeral 200 denotes a small arm having a short arm provided with three or more degree of freedom. And numeral 300 denotes a controller.

The large arm 100 is a large-sized manipulator which has seven movable sections moving independently and a capturing device 101 at its tip. As described in U.S. Pat. No. 4,105,241, the capturing device is capable of coupling in any direction without looseness. In addition to the mechanical coupling, the capturing device usually has an electrical coupling section and is able to supply electric power and signals.

The small arm 200 is a small-sized manipulator including six movable sections moving independently, a capturing device 201 having the same structure as the capturing device 101, a capturing knob 202, and a gripper 203.

The controller 300 controls the large arm 100 and the small arm 200. The configuration of the controller 300 will be described later by referring to FIG. 2.

In the large arm 100, numeral 102 denotes a large arm base. The large arm base 102 contains therein a drive unit for rotating the large arm 100 around the axis. Numerals 103 and 104 denote a forearm of the large arm and a first joint of the large arm, respectively. The forearm 103 of the large arm is moved around the center axis of the large arm base 102 by a drive unit contained in the first joint of the large arm. Numeral 105 denotes a rotary arm of the large arm. The rotary arm 105 of the large arm is rotated around the center axis of the forearm 103 of the large arm by a drive unit contained in the forearm 103 of the large arm. Numerals 106 and 107 denote a brachium of the large arm and a second joint of the large arm, respectively. The brachium 106 of the large arm is rotated around the center axis of the second joint 107 of the large arm by a drive unit contained in the second joint 107 of the large arm. Numeral 108 denotes a wrist of the large arm. The wrist 108 is rotated around a center axis located at the tip of the brachium 106 of the large arm (pitch movement). Numeral 109 denotes a wrist roll section of the large arm rotated around the center axis of the wrist 108 of the large arm. Numeral 110 denotes a wrist yaw portion. The wrist yaw portion 110 is rotated around a center axis perpendicular to the center axis of the wrist roll portion. The rotary arm 105 of the large arm has capturing knobs 111 and 112, and the brachium 106 of the large arm 106 has a capturing knob 113.

The small arm 200 is so constructed as to have a capturing device 201 at one end thereof. The capturing device 201 is attached to a small arm base 204. The small arm base 204 rotates the gripper 203 side of the small arm 200 around the center axis. Numerals 205 and 206 denote a forearm of the small arm and a brachium of the small arm, respectively. The forearm 205 of the small arm and the brachium 206 of the small arm are rotated around center axes perpendicular to the center axis of the small arm base 204, respectively. Numeral 207 denotes a wrist of the small arm. The wrist 207 of the small arm is rotated around the center axis of the brachium of the small arm (roll movement). Numeral 208 denotes a pitch joint of the small arm. The pitch joint 208 of the small arm is rotated around an axis perpendicular to the center axis of the wrist 207 of the small arm.

Numeral 209 denotes a yaw joint of the small arm. The yaw joint 209 of the small arm rotates a gripper 203 at the tip thereof around a center axis perpendicular to both the pitch joint 208 of the small arm and the center axis of the wrist 207 of the small arm. Numeral 210 denotes a television camera attached to the small arm base 204.

A control circuit for operating the mechanism of FIG. 1 will now be described by referring to FIG. 2.

In the controller 300, numeral 301 denotes a power source. Numerals 302 and 303 denote a large arm operation command generation unit and a large arm control processing unit, respectively. Numeral 304 denotes a central processing unit. Numerals 305 and 306 denote a small arm operation command generation unit and a small arm control processing unit, respectively.

The large arm control processing unit 303 and the small arm control processing unit 306 receive commands respectively from the large arm operation command generation unit 302 and the small arm operation command generation unit 305 to drive and control seven and six movable portions moving independently and capturing devices 101 and 201 of respective arms.

That is to say, numerals 401, 402, 403, 404, 405, 406 and 407 denote driving control circuits for the large arm base 102, the first joint 104 of the large arm, the rotary arm 105 of the large arm, the second joint 107 of the large arm, the wrist 108 of the large arm, the wrist roll portion 109 of the large arm, and the wrist yaw joint 110 of the large arm. And numeral 408 denotes a driving control circuit for the capturing device 101. Numerals 307, 308, 309 and 310 denote large arm connection terminal plates disposed on the capturing device 101 and on the capturing knobs 111, 112 and 113. Numerals 409, 410, 411, 412, 413 and 414 denote drive control circuits for six independent movable sections of the small arm 200, i.e., the small arm base 204, the forearm 205 of the small arm, the brachium 206 of the small arm, the wrist 207 of the small arm, the pitch joint 208 of the small arm, and the yaw joint 209 of the small arm, respectively. Numerals 415 and 416 denote drive control circuits for the capturing device 201 and the gripper 203.

These drive control circuits 409 to 415 enter the large arm base 102 and communicate with the large arm connection terminal plate 307 of the capturing device 101 located at the tip of the large arm 100. The drive circuits 409 to 415 communicate also with the large arm connection terminal plate 308 of the capturing knob 111, the large arm connection terminal plate 309 of the capturing knob 112, and the large arm connection terminal plate 310 of the capturing knob 113.

Numeral 417 denotes a power supply circuit. The power supply circuit 417 is connected to seven movable portions 102 to 104 and 107 to 110 of the large arm, the capturing device 101, and the large arm connection terminal plates 307 to 310.

Figure 3:
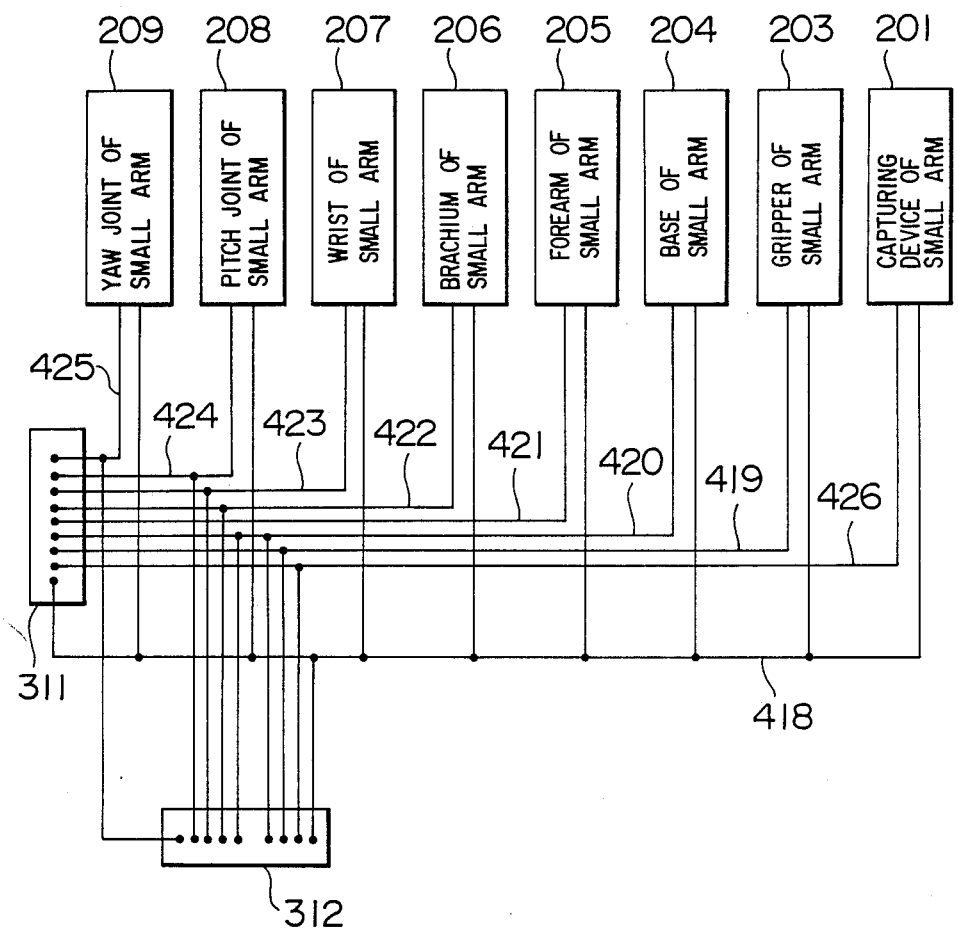
FIG. 3 is a block diagram showing an embodiment of a circuit included in the small arm illustrated in FIG. 1.

FIG. 3 shows the control circuit of the small arm 200. Numerals 311 and 312 denote small arm connection terminal plates connected to the capturing device 201 and the capturing knob 202, respectively. Numeral 418 denotes a small arm power supply circuit, and numeral 419 denotes a driving control circuit of the gripper 203. Numerals 420, 421, 422, 423, 424 and 425 denote driving control circuits for six movable portions of the small arm, i.e., the small arm base 204, the small arm forearm 205, the brachium 206 of the small arm, the wrist 207 of the small arm, the pitch joint 208 of the small arm, and the yaw joint 209 of the small arm. And the numeral 426 denotes a driving control circuit for the capturing device 201.

Figure 2:
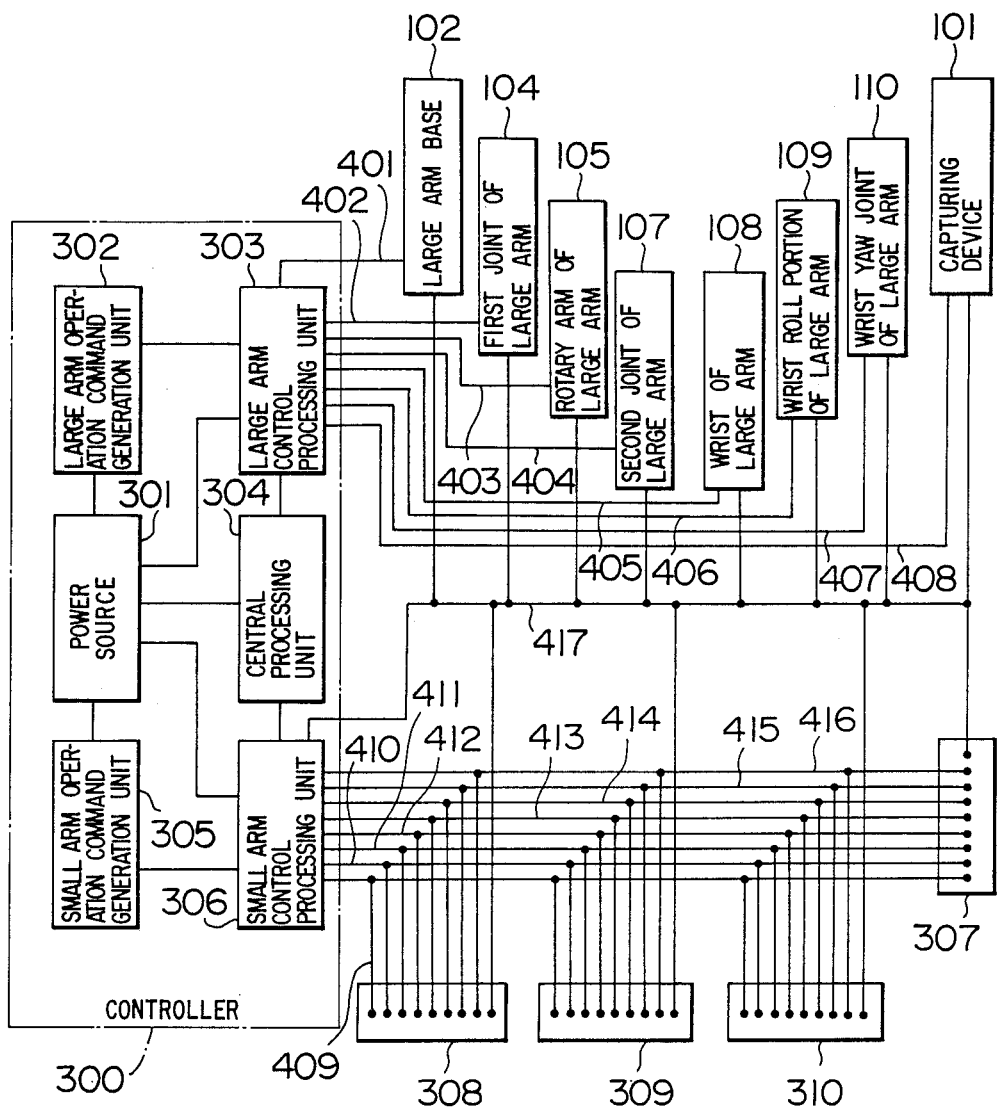
FIG. 2 is a block diagram showing an embodiment of circuits included in a controller and a large arm illustrated in FIG. 1.

The small arm power supply circuit 418 is electrically connected to the power supply circuit 417 illustrated in FIG. 2. The driving control circuits 419, 420, 421, 422, 423, 424, 425 and 426 are electrically connected to the driving control circuits 416, 409, 410, 411, 412, 413, 414 and 415 illustrated in FIG. 2, respectively.

The small arm power supply circuit 418 is connected to the above described six movable portions of the small arm, the gripper 203 and the capturing device 201.

The driving control circuits 401 to 407 and 409 to 414 are servo control circuits, each of which comprises a motor drive circuit, a motor speed detection circuit and a motor position detection circuit and has identical configuration. Accordingly, their operation will now be described by choosing the large arm base 102 as a representative example. Driving methods of other movable portions of the large arm and movable portions of the small arm will not be described individually.

Figure 4:
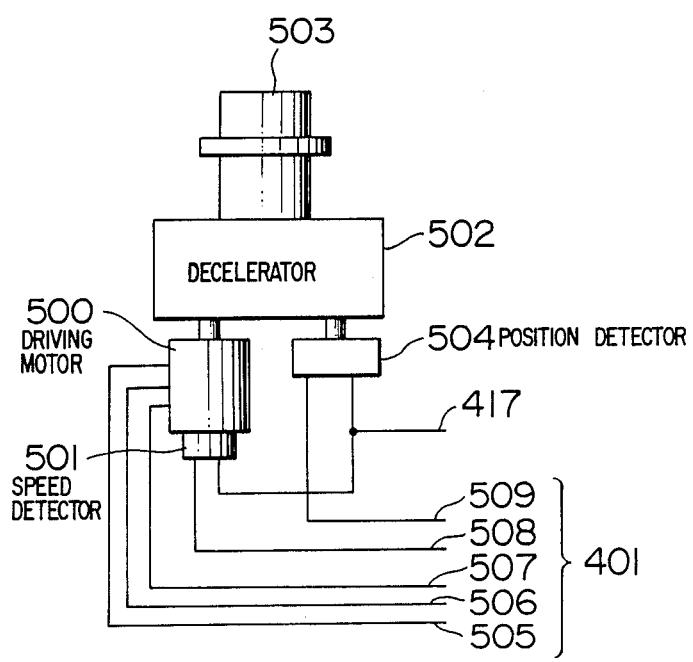
FIG. 4 is a block diagram showing an example of a drive unit of a large arm base illustrated in FIG. 2.

FIG. 4 shows a drive unit for the large arm base 102.

Numeral 500 denotes a motor for driving the large arm base 102. Numerals 501 and 502 denote its speed detector and its decelerator, respectively. Numerals 503 and 504 denote an output joint of the large arm base 102 and a position detector of the output joint 503.

Numerals 505, 506 and 507 denote a set of drive circuits for driving a drive motor 500. Numerals 508 and 509 denote a speed detection circuit and a position detection circuit for output signals of the speed detector 501 and the position detector 504.

The speed detector 501 and the position detector 504 are connected to the power supply circuit 417 described before by referring to FIG. 2 in order to send out output signals.

The driving control circuit 401 for the large arm base 102 described before by referring to FIG. 2 includes the drive circuits 505, 506 and 507, the speed detection circuit 508, and the position detection circuit 509.

On the basis of the command from the large arm operation command generation device 302, the large arm control processing device 303 calculates the control value of the large arm base 102 to output it. This output is conveyed to the driving motor 500 shown in FIG. 4 via drive circuits 505, 506 and 507. When the driving motor 500 is rotated, its speed is detected by the speed detector 501. The detected signal is fed back to the large arm control processing unit 303 via the speed detection circuit 508.

Further, the rotation of the driving motor 500 is conveyed to the decelerator 502. And the rotation position of the driving motor 500 is detected by the position detector 504. The rotation position signal thus detected is fed back to the large arm control processing unit 303 via the position detection circuit 509.

The large arm control processing unit 303 receives the command of the large arm operation command generation unit 302 and feedback signals of the speed detection circuit 508 and the position detection circuit 509. In conjunction with the central processing unit 304, the large arm control processing unit 303 controls the drive unit of the large arm base 102.

The capturing devices 101 and 201 will now be described by referring to FIG. 5.

Figure 5:
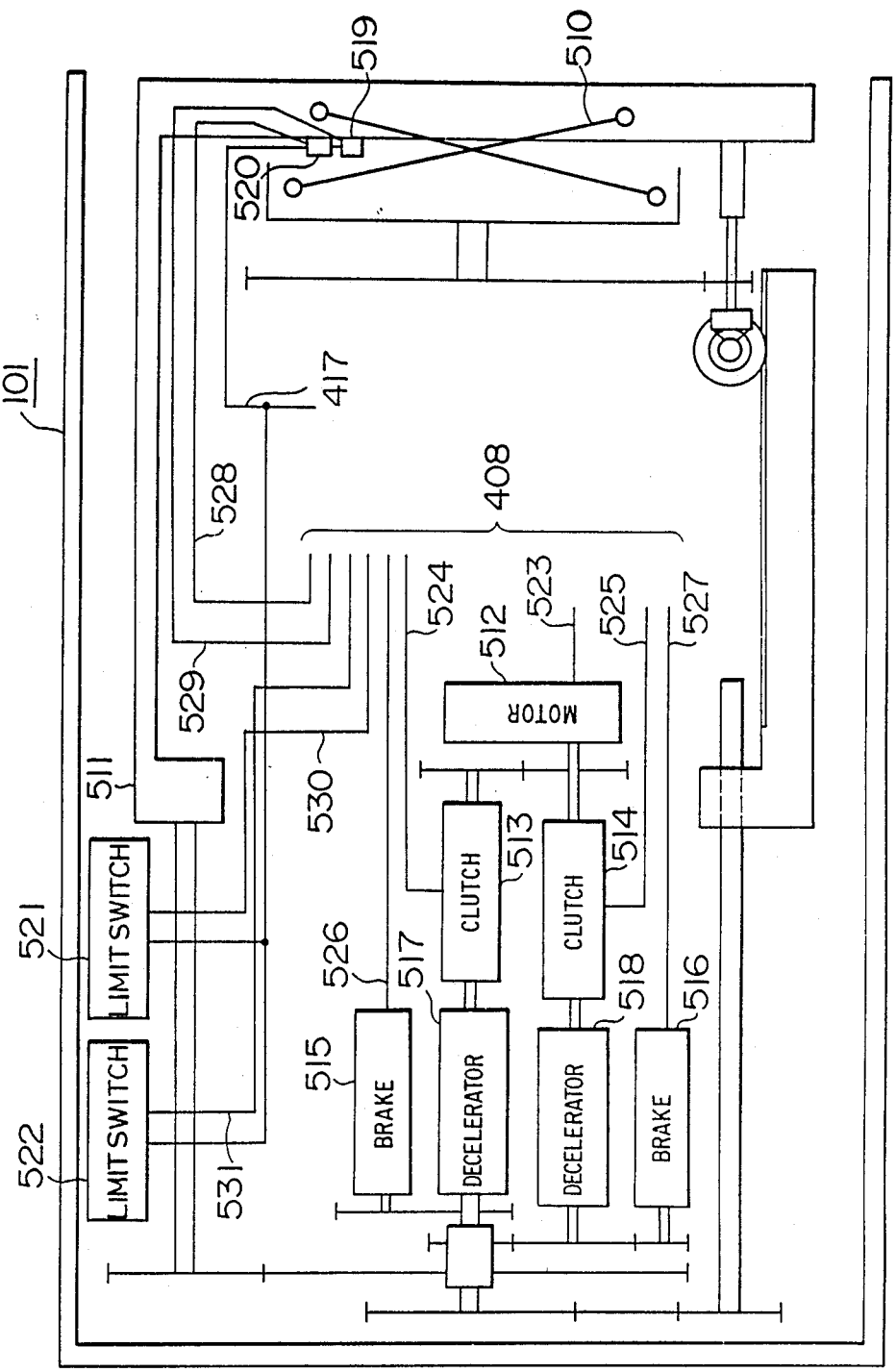
FIG. 5 is a block diagram showing a practical example of a capturing device illustrated in FIG. 2.

FIG. 5 shows resolved elements for explaining the function.

Numeral 510 denotes a trap element comprising three wires. One end of the wire is fixed, while the other end is rotated by one third circumference, a rotation section being formed. When the capturing knobs 111, 112, 113 and 202 have entered the capturing devices 101 or 201, capturing is caused. A component usable as the capturing element 510 is described in U.S. Pat. No. 4,105,241.

Numeral 511 denotes a pull-in element. The pull-in element 511 has a ball screw structure and pulls in the capturing element 510 to couple it to a coupling element (not illustrated) of the capturing device.

Numeral 512 denotes a motor commonly used for the capturing element 510 and the pull-in element 511. The power division is transmitted by clutches 513 and 514. Numerals 515 and 516 denote brakes. The brakes 515 and 516 are used to keep the states of the capturing element 510 and the pull-in element 511. Numerals 517 and 518 denote decelerators. The decelerators 517 and 518 are disposed between the capturing element 510 and the clutch 513 and between the pull-in element 511 and the clutch 514, respectively. The decelerators 517 and 518 decelerate the speed of the motor 512 to raise the torque. In order to confirm the completion of the operation of the capturing element 510 and the pull-in element 511, limit switches 519, 520, 521 and 522 are disposed at ends of respective operation regions.

In order to supply operation commands to the above described motor 512, clutches 513 and 514, and brakes 515 and 516, control circuits 523, 524, 525, 526 and 527 are disposed. Limit signal circuits 528, 529, 530 and 531 are fed back from the limit switches 519, 520, 521 and 522 to the large arm control processing unit 303 or the small arm control processing unit 306. These control circuits 523, 524, 525, 526 and 527 and limit signal circuits 528, 529, 530 and 531 are collectively shown as the drive control circuit 408 in FIG. 2 in case of the capturing device 101. They are collectively shown as the drive control circuit 415 in case of the capturing device 201. The power supply circuit 417 of FIG. 2 is connected to the limit switches 519, 520, 521 and 522 to supply power to them. The gripper 203 is not different from a conventional gripper. Its circuit configuration is basically the same as that of capturing devices 101 and 201. Accordingly, detailed explanation will be omitted.

The operation of this manipulator system will now be described.

When commands concerning the position (X, Y, Z) and direction ($\alpha$, $\beta$, $\gamma$) of the attachment position of the capturing device 101 are generated by the large arm operation command generation unit 302, the large arm control processing unit 303 sends out respective drive control commands ($\delta_{11}$, $\delta_{21}$, $\delta_{41}$, $\delta_{51}$, $\delta_{61}$ and $\delta_{71}$) for six movable portions included in seven movable portions of the large arm excepting the rotary arm 105 of the large arm in conjunction with the central processing unit 304. These signals are conveyed to drive units of respective joints via the driving control circuits 401, 402 and 404 to 407. Taking the case of the large arm base 102 as an example, the driving control command $\delta_{11}$ is conveyed to the drive circuits 505, 506 and 507 among the drive circuits 505, 506 and 507, the speed detection circuit 508 and the position detection circuit 509 constituting the driving control circuit 401. The driving motor 500 is activated and a signal is fed back from the position detector 504 to the large arm control processing unit 303 via the position detection circuit 509. If the driving motor 500 has reached the position specified by the above described drive control command $\delta_{11}$, control is maintained so as to keep the driving motor 500 at that position. In this way, the attachment position of the capturing device 101 of the large arm 100 is so controlled as to meet the position and direction directed by the large arm operation command generation unit 302. The rotary arm 105 of the large arm is disposed for the purpose of rotating the capturing knobs 111 and 112 disposed on the rotary arm 105. The attachment position of the capturing device 101 is not affected at all by such rotating operation. Accordingly, the command for the rotary arm 105 of the large arm is put out independently of other operating members. However, its operation method is not different from other operation members.

The operation of the small arm 200 is carried out in accordance with the same method as the operation of the large arm 100 excepting the rotary arm 105. That is to say, the output of the small arm operation command generation unit 305 undergoes arithmetic processing. The resultant commands are conveyed to respective operation members. The contents are not different from those of the large arm 100 and hence will not be described.

The capturing device 101 operates in accordance with sequential operation commands supplied from the large arm operation command generation unit 302. When the capturing device 101 approaches the capturing projection 202 of the small arm 200 to take it into inside thereof, the large arm operation command generation unit 302 connects the clutch 513, and opens the clutch 514 and the brake 515 to supply a command to the motor 512. Three rotary sections of the capturing element 510 thus move to capture the capturing knobs 202 by using three wires. The completion of capture is detected by the limit switch 520 and conveyed to the large arm control processing unit 303. As a result, the large arm operation command generation unit 302 stops the motor 512, puts on the brake 515, releases the clutch 513, puts on the clutch 514, releases the brake 516, and actuates the motor 512 again. As a result, the pull-in element 511 is actuated to pull in the capturing projection inside the capturing device 101 and couple it with a coupling element (not illustrated) of the capturing device. The completion of coupling is detected by the limit switch 522 and conveyed to the large arm control and processing unit 303 via the limit signal circuit 531. The motor 512 is thus stopped. The brake 516 is put on and the clutch 514 is released. As a result, coupling of the capturing device 101 with the capturing knob 202 of the small arm 200 is finished.

If the capturing device 101 of the large arm 100 is thus coupled to the capturing knob 202 of the small arm 200, an electrical coupling unit (not illustrated) then operates to couple terminals of the large arm connection terminal plate 307 with terminals of the small arm connection terminal plate 312. By the driving control circuit 426 extending from the large arm 100 and the small arm power supply circuit 418 as shown in FIG. 3, therefore, the capturing device 201 of the small arm 200 is ready to perform completely the same operation as the operation of the above described capturing device 101 in response to the command supplied from the small arm operation command generation unit 305.

Therefore, the capturing device 201 of the small arm 200 can be coupled with the capturing projection 111 disposed within the reach of the large arm 100.

The capturing knob 111 has the large arm connection terminal plate 308 as shown in FIG. 2. Accordingly, all driving control circuits of the small arm 200 form a duplicate system comprising the circuit of the large arm connection terminal plate 308 and the circuit of the large arm connection terminal plate 307 of the capturing device 101 and the small arm connection terminal plate 312.

The method for separating the capturing device 101 from the capturing projection 202 will now be described.

When the large arm operation command generation unit 302 supplies commands (to the control circuits 525, 527 and 523) via the drive control circuit 408 so as to connect the clutch 514 of FIG. 5, release the brake 516 and actuate the motor 512, the pull-in element 511 moves to restore the pull-in stand-by condition of FIG. 5. The pull-in stand-by condition is detected by the limit switch 521 and conveyed to the large arm control processing unit 303 by the limit signal circuit 530. Succeedingly, the large arm operation command generation unit 302 stops the motor 512, puts on the brake 516 and releases the clutch 514 via the driving control circuit 408. Thereafter, the large arm operation command generation unit 302 supplies commands (to the control circuits 524, 526 and 523) so as to engage the clutch 513, release the brake 515 and actuate the motor 512. As a result, the capturing element 510 moves to restore the capture stand-by condition of FIG. 5.

The capture stand-by condition is detected by the limit switch 519 and conveyed to the large arm control processing unit 303 by the limit signal circuit 528. Succeedingly, the large arm operation command generation unit 302 stops the motor 512, puts on the brake 515 and releases the clutch 513 via the driving control circuit 408. Separation between the capturing device 101 and the capturing knob 201 of the small arm is thus completed.

The method heretofore described comprises the steps of coupling the capturing knob 202 of the small arm by the capturing device 101, coupling the small arm 200 with the capturing knob 111 on the rotary arm 105 of the large arm, making the small arm 200 controllable by the small arm operation command generation unit 305, and releasing the capturing device 101 from the capturing knob 202.

As a result, the capturing device 101 can be coupled with a capturing knob fixed to an object (not illustrated) which is within the operation range of the large arm 100.

On the other hand, the small arm 200 is ready to be controlled by the small arm operation command generation unit 305 via the capturing knob 111 on the rotary arm 105 of the large arm. In a range which can be reached by combining the small arm 200 and the rotary arm 105 of the large arm, therefore, it is possible to work on an object by using the gripper 203.

In the above described embodiment, therefore, it is possible to work on an object by using the gripper 203 of the small arm 200 while holding the object by using the capturing device 101 of the large arm 100.

Further, it is also possible to perform work, which cannot be attained by the gripper 203 of the small arm 200, by using the large arm 100 under the condition that a work tool (not illustrated) having a capturing knob is coupled with the tip of the large arm 100 by the capturing device 101. In case work must be performed by using the work tool and the gripper 203 alternately as well, therefore, the work tool can be replaced without spending time.

Further, it is possible to expand the operation range of the manipulator system comprising the large arm 100 and the small arm 200, by attaching the small arm 200 to not only the capturing knob 111 but also the capturing knobs 112 and 113.

If a fixed stand is grappled by the capturing device 101 of the large arm and work is performed by using the small arm, force exerted upon the small arm is caused between the small arm and the capturing device. When the small arm is attached to the capturing knob 113, therefore, it is not necessary to consider the degradation in position precision due to rattling or deformation caused between the brachium 106 of the large arm and the base 102. Therefore, it is possible to impose a large load upon only the small arm.

In accordance with the present invention as described above, it is possible to move the small arm 200 to an arbitrary location having the capturing knobs 111, 112 or 113 to expand the operation range by using the capturing device 101 located at the tip of the large arm 100. Further, it is possible to perform simultaneous complex work using two work tools by attaching a work tool to the tip of the capturing device 101 located at the tip of the large arm and by holding another work tool with the gripper 203 located at the tip of the small arm 200 attached to the arm of the large arm.

Further, it is possible to hold down an object with one of the large arm 100 and the small arm 200 while working on the object with the other of the large arm 100 and the small arm 200.

Further, it is possible to largely expand the operation region of the manipulator system comprising the large arm 100 and the small arm 200 by adding an extra operation section such as the rotary arm 105 of the large arm 100 for coupling the small arm 200 with a location out of reach of the capturing device 101 of the large arm or expanding the operation region after the coupling instead of positioning the large arm.

Especially when this manipulator system is desired to be used in a severe environment, it is also possible to easily infer from the present invention a method comprising the steps of placing only the small arm on a truck, making movable the large arm connection terminal plates (307, 308, 309 and 310) while maintaining the coupling of those plates with cords, coupling the large arm connection terminal plates with the truck by using the capturing device 101, attaching a rope for pullback between the capturing device 101 of the large arm and the truck, and send out the truck into a severe environment region by pushing the truck with the capturing device 101.

By using this method, it is possible to limit the time taken for the operation portion of the manipulator to operate in the severe environment to the minimum. As a result, the life of the manipulator can be improved. In addition, this method is effective for the human safety.

A plurality of capturing knobs (111, 112 and 113) are attached to the large arm 100. By attaching work tools to capturing knobs whereto the small arm is not coupled, rapid and accurate work tool replacement becomes possible even if an accurate device for storing work tools is not made.

In accordance with the present invention, attaching devices (111, 112 and 113) for attaching the small arm 200 are disposed on the arm portion of the large arm. Therefore, a mechanism for guarding mechanically and thermally their attaching devices (capturing knobs and capturing devices) can be advantageously constructed with the large arm integrally. Especially in a severe environment such as space, the mechanical and thermal protection is important. It largely increases the cost to dispose the guard mechanism separately from the manipulator.

In accordance with the present invention, the small arm 200 is branched from the large arm 100 to operate in cooperation with the large arm 100. As compared with the case where two arms are disposed independently, therefore, the weight increase is slight. As a whole, a small-sized, light-weight double-arm manipulator system can be constructed.

In the description of the embodiment of the present invention, commanding the large arm operation command generation unit 302 and the small arm operation command generation unit 305 was not particularly explained. In many cases, however, the commands are produced by a joystick or the like manipulated by a person. In these cases, a scheme in which the movement and installation are performed under the condition that the TV camera 210 is attached to the base 204 of the small arm 200 can be conveniently used.

Further, limit switches may be disposed for respective capturing knobs (111, 112 and 113), and a limit signal circuit may be disposed for generating a signal when the capturing device 201 is coupled with the capturing projection and for transmitting the signal to the large arm control processing unit 303. The large arm control processing unit 303 recognizes the absolute position where the base of the small arm 200 is disposed. Accordingly, it is possible to regard the large arm 100 and the small arm 200 as one system and let one command generation unit direct the tip position of the small arm instead of separately generating commands of the large arm and the small arm.

In the description of the embodiment of the present invention, the large arm 100 has one capturing device (101) and three capturing projections (111, 112 and 113), and the small arm (200) has one capturing device (201) and one capturing projection (202). Even if four capturing devices are disposed on the large arm 100 and two capturing devices are disposed on the small arm 200, a similar effect can be obtained.

In case the capturing device 201 of the small arm 200 is replaced by a capturing projection, however, it is also possible to serially connect the small arm 200 to the capturing device 101 of the large arm 100. At this time, it is possible to prepare two or more small arms, serially connect one small arm to the tip of the large arm, and branch other small arms from the arm of the large arm to perform complex work.

On the other hand, it is possible to obtain a manipulator system which is economical as a whole by disposing a plurality of capturing projections 111, 112 and 113 having simple structures on the arm of the large arm 100 and disposing one expensive capturing device 201 on the small arm 200.

In the foregoing description, one manipulator was regarded as a large arm and the other manipulator was regarded as a small arm. It is matter of course that such distinction is not necessary in some cases.

We claim:

1. A manipulator system comprising:
   a large articulated arm having actuating-side capturing means on the end of said arm and having at least one actuated-side capturing means on an intermediate portion thereof:
   a small articulated arm having at least one actuating-side capturing means and at least one actuated-side capturing means on the base of said small arm thereof: and
   control means disposed on the base portion of said large arm, said control means actuating said actuating-side capturing means disposed on the end of said large arm to connect to said actuated-side capturing means of said small arm, thereafter moving said actuating-side capturing means of said small arm toward said actuated-side capturing means of said large arm to be coupled therewith by using said large arm, after connecting said actuating-side capturing means of said small arm to actuated-side capturing means of said large arm supplying power and signals from said actuated-side capturing means of said large arm to said actuating-side capturing means of said small arm, and releasing the coupling between said actuating-side capturing means of said large arm and said actuated-side capturing means of said small arm.

2. A manipulator system according to claim 1, wherein said actuating-side capturing means of said large arm and said actuating-side capturing means of said small arm are electrically connected with each other via respective disposed connection terminal plates, and said actuating-side capturing means of said small arm and said actuating-side capturing means of said large arm are electrically connected with each other via respectively disposed connection terminal plate.

3. A manipulator system according to claim 1, wherein said control means includes:

a power source;

first command means for directing an operation of said large arm;

second command means for directing an operation of said small arm;

first control processing means for driving and controlling a movable section and the actuating-side capturing means of said large arm on the basis of a command supplied from said first command means; and second control processing means for driving and controlling a movable portion and the actuating-side capturing means of said small arm on the basis of a command supplied from said second command means.

4. A manipulator system, comprising:

a first articulated manipulator arm having at least first and second capturing mechanisms;

a second articulated manipulator arm having at least third and fourth capturing mechanisms;

control means connected to said first manipulator arm for generating control commands for said first and second manipulator arms;

wherein said first manipulator arm is adapted to couple one of said first and said second capturing mechanisms with a respective one of said third and said fourth capturing mechanisms of said second manipulator arm to transmit said control commands for said second manipulator arm to said second manipulator arm through one of said first and said second capturing mechanisms and the respective one of said third and said fourth capturing mechanisms:

wherein said control means generates the following control commands sequentially:

a control command directed to said first manipulator arm to effect coupling of said first capturing mechanism with said third capturing mechanism of said second manipulator arm;

a control command directed to at least one of said first and second manipulator arms to effect coupling of said second capturing mechanism of said first manipulator arm with said fourth capturing mechanism of said second manipulator arm; and a control command directed to at least one of said first and second manipulator arms to effect release of said first capturing mechanism from said third capturing mechanism.

5. A manipulator system according to claim 4, wherein said second capturing mechanism of said first manipulator arm and said third capturing mechanism of said second manipulation arm have capturing knobs, and said first capturing mechanism of said first manipulator arm and said fourth capturing mechanism of said second manipulator arm have capturing means capable of capturing said knobs.

6. A manipulator system according to claim 4, wherein said first manipulator arm has the first capturing mechanism on an end of said first manipulator arm and has the second capturing mechanism on a side of said first manipulator arm.

7. A manipulator system according to claim 6, wherein said first manipulator arm having said first capturing mechanism thereon has a degree of freedom for moving said first capturing mechanism.

8. A manipulator system according to claim 4, wherein each of said first to fourth capturing mechanisms has a mechanical coupling portion and an electrical coupling portion, which can be coupled separately.

9. A manipulator system according to claim 4, wherein a television camera is attached to said second manipulator arm.

10. A manipulator system according to claim 4, wherein said first capturing mechanism of said first manipulator arm and said fourth capturing mechanism of said second manipulator arm have capturing knobs, and said second capturing mechanism of said first manipulator arm and said third capturing mechanism of said second manipulator arm have capturing means capable of capturing said knobs.

11. A manipulator system according to claim 4, wherein a third manipulator arm is coupled with said second capturing mechanism of said first manipulator arm to operate in cooperation with said second manipulator arm coupled with said first capturing mechanism.

12. A manipulator system according to claim 4, wherein said first manipulator arm has a fifth capturing mechanism, and said second manipulator arm is selectively coupled with said first and fifth capturing mechanism.

* * * * *